United States Patent [19]

Weber

[11] 4,434,146

[45] Feb. 28, 1984

[54] SCRUBBING OF HYDROGEN SULPHIDE USING PH CONTROL TO CONTROL THIOSULFATE FORMATION

[75] Inventor: Günter Weber, Linden, Fed. Rep. of Germany

[73] Assignee: Linde Aktiengesellschaft, Wiesbaden, Fed. Rep. of Germany

[21] Appl. No.: 406,807

[22] Filed: Aug. 10, 1982

[30] Foreign Application Priority Data

Apr. 30, 1982 [DE] Fed. Rep. of Germany ....... 3216160

[51] Int. Cl.³ ...................... B01D 53/34; C01B 17/05
[52] U.S. Cl. .................................. 423/226; 423/224; 423/573 R
[58] Field of Search ................... 423/224, 226, 573 R, 423/573 G

[56] References Cited

U.S. PATENT DOCUMENTS 4,113,553 9/1978 Samuelson .................. 423/573 R X
4,243,648 1/1981 Fenton ........................... 423/573 R

FOREIGN PATENT DOCUMENTS 1488659 10/1977 United Kingdom ........... 423/573 R

OTHER PUBLICATIONS

Mackinger et al., "Sulfint Process", Hydrocarbon Processing, Mar. 1982, pp. 169-172.
Kohl et al., "Gas Purification", 3rd Ed., 1979, Gulf Publishing Company, Houston, pp. 476-482.

Primary Examiner—Earl C. Thomas
Attorney, Agent, or Firm—Millen & White

[57] ABSTRACT

In a process wherein hydrogen sulphide is removed from a gaseous mixture by scrubbing with an aqueous alkaline scrubbing solution containing an oxidizing agent, which process ordinarily results in a buildup of $S_2O_3^{--}$ ion, in order to reduce the rate of formation of $S_2O_3^{--}$ ions, the pH of the alkaline scrubbing solution is maintained at below 9 preferably at 8.0-8.5, with $CO_2$ being preferably employed as the pH adjusting reagent.

9 Claims, No Drawings

SCRUBBING OF HYDROGEN SULPHIDE USING PH CONTROL TO CONTROL THIOSULFATE FORMATION

CROSS-REFERENCE TO RELATED APPLICATION

This application relates to concurrently filed application entitled "SCRUBBING AND OXIDATION OF HYDROGEN SULFIDE WITH REMOVAL OF DISSOLVED OXYGEN FROM SCRUBBING SOLUTION BEFORE REUSE" of Guenter Weber, the contents of which are incorporated by reference herein.

BACKGROUND OF THE INVENTION

This invention relates to a process for the removal of hydrogen sulphide from gaseous mixtures by scrubbing with an aqueous alkaline scrubbing solution containing an oxidizing agent. The hydrogen sulphide is absorbed from the scrubbing solution in a scrubbing column and oxidized principally to sulphur, as well as a minor amount of sulfate ($SO_4^{--}$) and thiosulfate ($S_2O_3^{--}$). The scrubbing solution containing resultant reduced oxidizing agent is preferably subsequently regenerated for reuse in a downstream oxidizer by exposure to an oxygen-containing gas.

A process of this type is described, for example, in British Patent Specification No. 1,488,659. According to this process, the gas to be cleaned is scrubbed with an aqueous alkaline solution, such as a sodium carbonate solution having a pH between 8 and 9, this solution containing a soluble salt, such as the sodium salt of anthraquinonedisulphonic acid, and a metal vanadate, the vanadium being in the five-valent oxidation state. The absorbed hydrogen sulphide dissociates in the solution with the formation of $HS^-$ ions which reduce the vanadium to the four-valent oxidation state, elementary sulphur being liberated. The reduced vanadium can be re-oxidized by an oxidation reaction with an oxygen-containing gas in the presence of the anthraquinonedisulphonic acid.

It has been found, however, that part of the hydrogen sulphide is oxidized to soluble sodium sulphate and sodium thiosulphate which gradually build up in concentration in the scrubbing solution and must be removed. Whereas the removal of sodium sulphate can be accomplished, for example, by simple crystallization, this is not possible for sodium thiosulphate because of its high solubility. Furthermore, since sodium thiosulphate is a substance which is ecologically deleterious because of its high biological oxygen demand, the scrubbing solution containing the buildup of $S_2O_3^{--}$ cannot simply be discarded. Thus, according to the British Patent Specification No. 1,488,659, it is proposed to add to the scrubbing solution a water-soluble aromatic polyhydroxy compound, such as dihydroxybenzene, dihydroxynephthalene or dihydroxyanthracene, which prevents the formation of sodium thiosulphate. This procedure, though useful, has the disadvantage of using costly additives, the recovery of which involves further problems.

SUMMARY OF THE INVENTION

An object of the present invention is to provide a process of the general type mentioned above wherein the formation of $S_2O_3^{--}$ ions is prevented in a simple and cost-effective manner.

Upon further study of the specification and appended claims, further objects and advantages of this invention will become apparent to those skilled in the art.

These objects are achieved according to the invention by shifting the ratio of $SO_4^{--}$ to $S_2O_3^{--}$ in favor of $SO_4^{--}$ by decreasing the pH in the scrubbing solution.

The invention depends on the surprising recognition that the ratio of $SO_4^{--}$ to $S_2O_3^{--}$ is strongly influenced by the pH of the scrubbing solution: the lower the pH of the scrubbing solution, the more favored is the formation of $SO_4^{--}$. Thus, the problem of the buildup of ecologically deleterious thiosulphate in the scrubbing solution is prevented in a very simple manner. According to the invention, the formation of $S_2O_3^{--}$ is either suppressed or maintained within a predetermined range of tolerance the latter range being about 0.1 to 0.15, preferably 0 to 0.1 gram per liter per day.

According to a preferred embodiment of the process according to the invention, the pH is decreased or maintained to values less than 9, preferably between 8.0 and 8.5, especially within said range not higher than 8.4, a particularly preferred range being 8.3–8.5. The pH control is preferably effected by passing in $CO_2$ into the scrubbing solution. This may occur at any site of the scrubbing cycle by any means, or, alternatively, externally by using an additional vessel.

In a preferred embodiment of the invention, $CO_2$, optionally with an oxygen-containing gas, is passed into the scrubbing solution into the oxidizer or, alternatively, downstream from the oxidizer. It is advantageous thereby to use as the $CO_2$ source a gas produced during the cleaning up of crude gases having a high $CO_2$ content, e.g. flash-gas (containing about 97% $CO_2$, 1.5% $H_2S$) from the regeneration of a physical scrubbing solution (e.g. methanol) for the removal of acidic components from crude gases.

The present invention can also be used with other oxidizing systems than that one using vanadium and anthraquinonedisulphonic acid. Such an oxidizing system is described for example in Hydrocarbon Processing, March 1982, pages 169 to 172, this system containing chelate bound $Fe^{3+}$ as active component.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

Oxidative hydrogen sulphide scrubbing steps are conducted at pH values from 8.3 to 8.5 and from 9.0 to 9.5 in a recycling apparatus which corresponds in its basic construction to an industrial plant. In both experiments, the scrubbing solution contains, as the oxidizing agent, vanadium in an amount of 1.2 g/l and anthraquinonedisulphonic acid in an amount of 3 g/l. In the experiment with the pH at 9.0 to 9.5, a continuously increasing formation of thiosulphate was observed, the measured rate of formation being about 5 g/l per day.

In the experiment with the pH at 8.3 to 8.5 (achieved by passing $CO_2$ into the oxidizer, the conditions being otherwise the same), the thiosulphate concentration increased to only 0.5 g/l during the same period of measurement and then remained constant throughout the further period of the experiment (about 500 hours).

EXAMPLE 2

A predetermined amount of scrubbing solution was several times consecutively loaded with hydrogen sulphide and regenerated again. The pH of the scrubbing solution was 9.5 and the scrubbing solution contained 1.5 g/l of vanadium and 3 g/l of anthraquinonedisulphonic acid as the oxidizing agent.

After 15 loading/regeneration cycles, there was a buildup of thiosulphate content of 1.86 g/l.

Thereafter the pH of the scrubbing solution was decreased according to the invention to 8.5. Under conditions which were otherwise the same, there was a thiosulphate content of only 0.15 g/l.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal of hydrogen sulphide from a gaseous mixture comprising scrubbing said gaseous mixture with an aqueous alkaline scrubbing solution containing an oxidizing agent, whereby the hydrogen sulphide is absorbed from the scrubbing solution and oxidized principally to sulphur with the formation of minor amounts of $SO_4^{--}$ and $S_2O_3^{--}$, the improvement which comprises suppressing the formation of the $S_2O_3^{--}$ to less than 0.15 gram per liter of scrubbing solution per day, said suppressing being conducted by introducing sufficient amounts of $CO_2$ into the scrubbing solution to maintain a pH of the scrubbing solution in the range of 8.0 and not higher than 8.4.

2. A process according to claim 1 further comprising regenerating resultant reduced oxidizing agent in a downstream oxidizer wherein an oxygen-containing gas reoxidizes the oxidizing agent, and the process is continuous and comprises a plurality of oxidizing-regeneration cycles.

3. A process according to claim 2, wherein the $CO_2$ is introduced into the oxidizer.

4. A process according to claim 2, wherein the $CO_2$ is introduced into the scrubbing solution downstream from the oxidizer.

5. A process according to claim 2, wherein a gas produced from the cleaning up of a crude gas having a high $CO_2$ content is used as the $CO_2$ source.

6. A process according to claim 1, wherein the oxidizing agent comprises a metal vanadate, the vanadium having a valence of five.

7. A process according to claim 2, wherein the oxidizing agent comprises a metal vanadate, the vanadium having a valence of five which is reduced to a valence of four during the scrubbing step, and wherein said reduced metal vanadate is oxidized in said oxidizer with an oxygen containing gas in the presence of anthraquinonedisulfonic acid.

8. A process according to claim 1, wherein the oxidizing agent is chelate bound trivalent iron.

9. A process according to claim 1, wherein the pH is at least 8.3.

* * * * *